US006437469B1

(12) United States Patent
Davis et al.

(10) Patent No.: US 6,437,469 B1
(45) Date of Patent: Aug. 20, 2002

(54) HEAT DISSIPATING COLLAR FOR MOTOR

(75) Inventors: Richard J. Davis, Broken Arrow; Eric E. Braun, Tulsa, both of OK (US)

(73) Assignee: Aaon, Inc., Tulsa, OK (US)

( * ) Notice: Subject to any disclaimer, the term of this patent is extended or adjusted under 35 U.S.C. 154(b) by 24 days.

(21) Appl. No.: 09/670,223

(22) Filed: Sep. 25, 2000

(51) Int. Cl.[7] .................. H02K 9/00

(52) U.S. Cl. .................. 310/64; 310/42

(58) Field of Search .................. 310/42, 52, 58, 310/59, 60 R, 60 A, 64, 66, 89; 174/16.1–16.3; 362/294, 373; 165/185, 80.1–80.3

(56) References Cited

U.S. PATENT DOCUMENTS

| | | | | |
|---|---|---|---|---|
| 3,707,037 A | * 12/1972 | Gutris | | 29/596 |
| 4,105,905 A | * 8/1978 | Barcus | | 310/59 |
| 4,321,423 A | 3/1982 | Johnson et al. | | |
| D267,005 S | 11/1982 | Dennis | | |
| 4,415,824 A | * 11/1983 | Meier | | 310/89 |
| 4,465,946 A | * 8/1984 | Springer | | 310/42 |
| 4,742,257 A | * 5/1988 | Carpenter | | 310/62 |
| 4,786,833 A | * 11/1988 | Knobel | | 310/89 |
| 4,840,222 A | 6/1989 | Lakin et al. | | |
| 5,019,737 A | * 5/1991 | Bruno | | 310/89 |
| 5,311,090 A | * 5/1994 | Ferlatte | | 310/88 |
| 5,877,576 A | * 3/1999 | CoChimin | | 310/64 |
| 5,940,268 A | 8/1999 | Miyahara et al. | | |
| 6,050,785 A | 4/2000 | Horng | | |
| 6,085,833 A | 7/2000 | Kimura et al. | | |
| 6,087,800 A | 7/2000 | Becker et al. | | |
| 6,097,601 A | 8/2000 | Lee | | |

* cited by examiner

*Primary Examiner*—Tran Nguyen
(74) *Attorney, Agent, or Firm*—Molly D. McKay

(57) ABSTRACT

A heat dissipating collar 10 for a motor 12 that consists of two identical halves 14A and 14B removably secured together at their two sets of mating ends, set 16J and 18S and set 16S and 18J. Each half 14A and 14B has a base portion 20A and 20B, respectively, with an arcuate internal surface, 22A and 22B, respectively, that rests against and receives heat from an exterior surface 24 of the motor 12. Each of the halves 14A and 14B is provided with a plurality of spaced apart, tapered fins 30 radiating outwardly from the base portions 20A and 20B so that heat received from the motor 12 by the base portions 20A and 20B is transferred from the base portions 20A and 20B to the fins 30 and dissipates to the surrounding air from the fins 30. Each fin 30 is secured to the base portion 20A or 20B of its respective half 14A or 14B and extends outward from the base portion 20A or 20B aligned with and parallel to the longitudinal axis 32 of the collar 10.

14 Claims, 2 Drawing Sheets

10
12
14A
14B
16J
16S
18J
18S
20A
20B
22A
22B
24
26
26
28A
28B
28A
28B
30

HEAT DISSIPATING COLLAR FOR MOTOR

BACKGROUND OF THE INVENTION

1. Field of the Invention

The present invention relates to a heat dissipating device that removably secures around a motor, forming a collar around the exterior of the motor that serves as a heat sink for the motor.

2. Description of the Related Art

The life of motors, such as those that are employed in heating and air conditioning units, could be increased if there was a way to retrofit the motor with a heat dissipating device so that the motor would run cooler. Such a device would need to be easily installable or replaceable in the field, would need to be constructed of material that conducts heat away from the motor effectively, and that would need to be relatively inexpensive to manufacture.

The present invention meets all of these demands. The present invention consists of two identical halves that can be quickly and removably secured together at the edges of the halves to form a collar around a motor. The present invention can, with the aid of a couple of clamps be secured to a motor in the field. The present invention is inexpensive to manufacture and is constructed of material and in a configuration that effectively dissipate heat from the motor to which the invention is attached.

SUMMARY OF THE INVENTION

The present invention is a heat dissipating collar for a motor that consists of two identical halves that removably secure together at their ends to form a circular collar that encircles a motor. Each half has a base portion with an arcuate internal surface that rests against an exterior surface of the motor when the collar is secured around the motor so that the arcuate internal surfaces of the base portions receive heat directly from the motor.

Each half is provided with an outwarding extending J-shaped arm on one end of the half and with a second outwardly extending straight arm on an opposite end of the half so that the straight arms of each of the halves are removably received in the J-shaped arms of the other half in order to secure the halves around the motor. A clamp holds the two pairs of ends together. Each of the straight arms is provided with a pair of raised lips to accommodate a clamp for the purpose of securing the straight arm to its associated J-shaped arm.

Each of the halves is provided with a plurality of individual, spaced apart fins radiating outwardly from the base portion of the half so that heat received by the base portion from the motor is transferred from the base portion to the fins and dissipates to the surrounding air from the fins. Each fin is secured to the base portion of its respective half and extends outward from the base portion. Each fin is aligned along the longitudinal axis of the collar so that air flowing longitudinally along the motor flows between the adjacent fins. Also, each of the fins is tapered along its length so that each fin has a thicker width at a proximal end of the fin than its width at its distal end. This tapered configuration allows for better heat transfer between the proximal and distal ends of the fins and allows for better heat dissipation.

DETAILED DESCRIPTION OF THE PREFERRED EMBODIMENT

Figure 1:
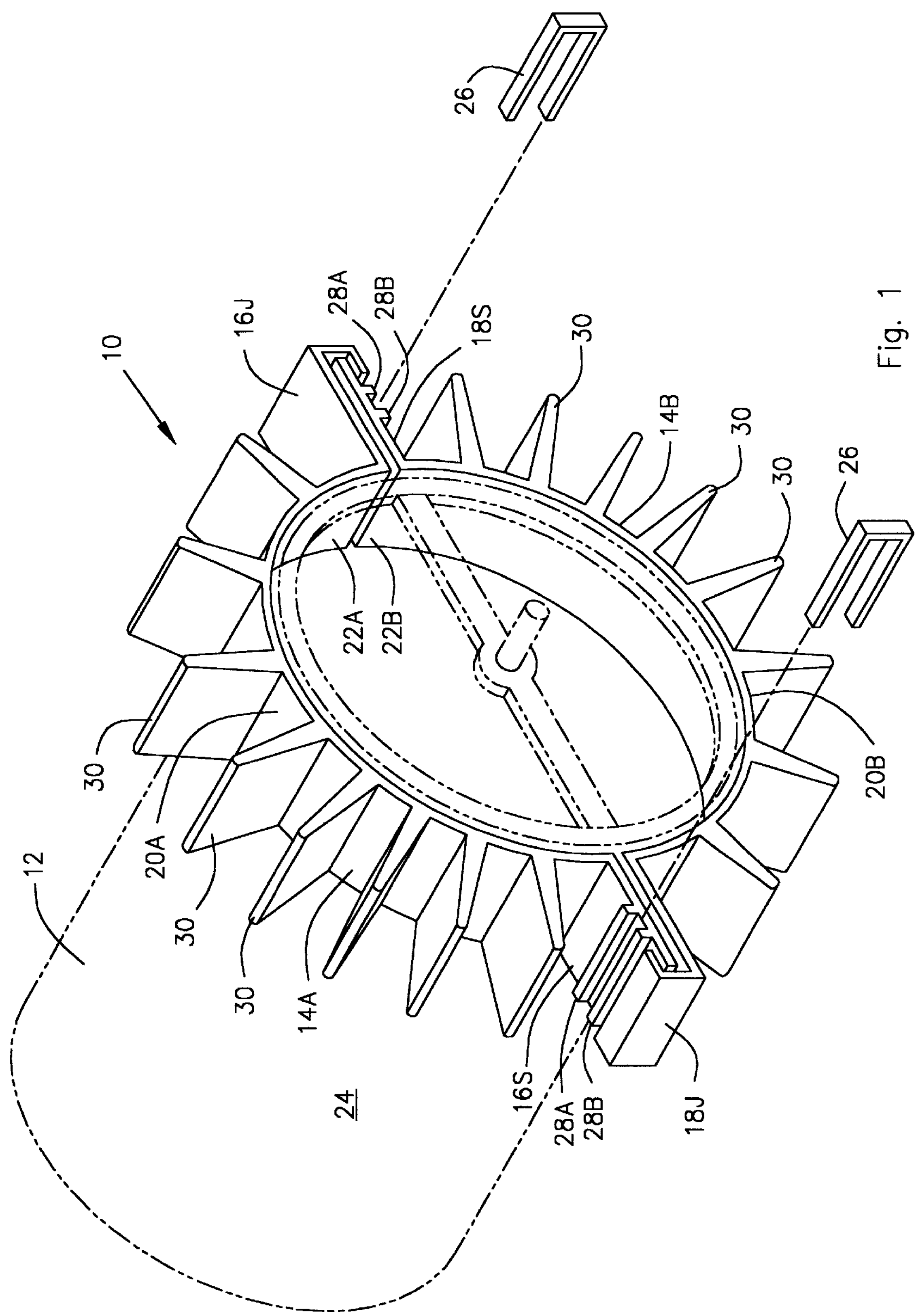
FIG. 1 is a perspective view of a heat dissipating collar constructed in accordance with a preferred embodiment of the present invention shown attached to a motor with the attaching clamps removed from the collar for clarity.
Figure 3:
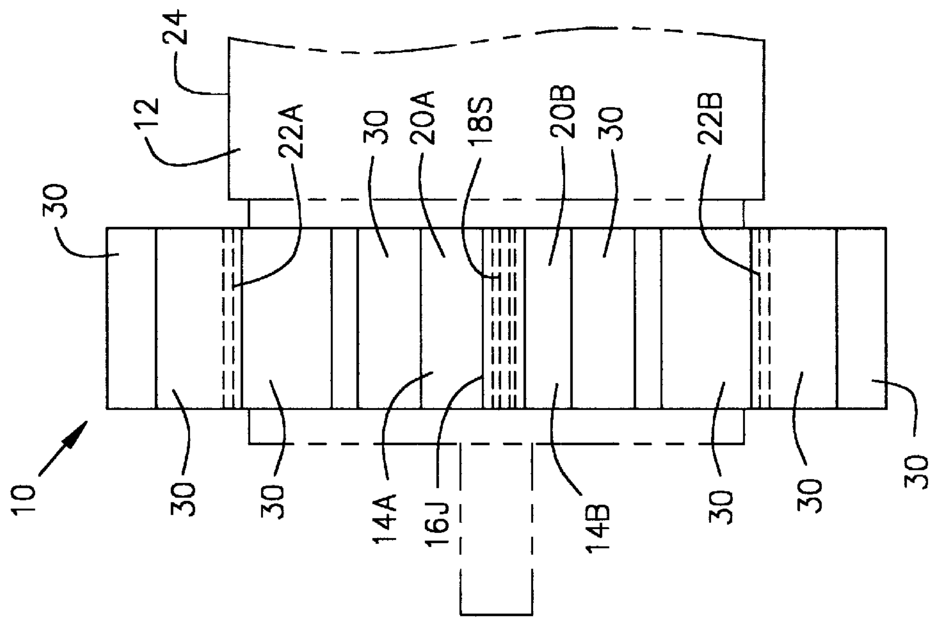
FIG. 3 is a side view of the heat dissipating collar of FIG. 2 taken along line 3—3.
Figure 2:
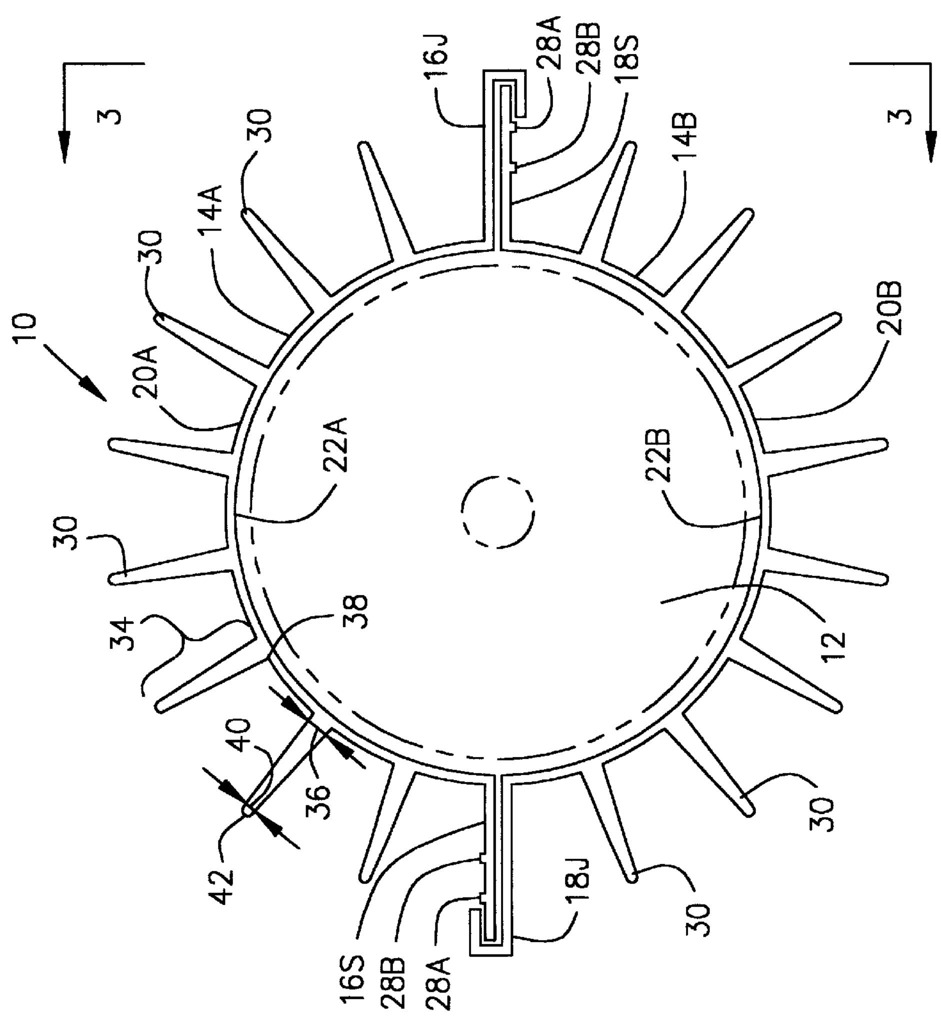
FIG. 2 is a front elevation of the heat dissipating collar of FIG. 1.

The Invention Referring now to the drawings and specifically to FIGS. 1, 2, and 3, there is illustrated a heat dissipating collar 10 for a motor 12 that is constructed in accordance with a preferred embodiment of the present invention. The collar 10 consists of two identical halves 14A and 14B. The half 14A has two ends 16J and 16S, and the other half 14B has two ends 18J and 18S. The halves 14A and 14B can be removably secured together at their ends, i.e. ends 16J and 18S secured together and ends 16S and 18J secured together, to form the circular collar 10 that encircles the motor 12.

Each of the halves 14A and 14B is constructed of a material that readily conducts heat, such as for example aluminum or other suitable material. Each half 14A and 14B of the collar 10 is provided with a base portion 20A and 20B having an arcuate internal surface 22A and 22B, respectively, that defines an arch of 180 degrees. The arcuate internal surfaces 22A and 22B of each half 14A and 14B rests against an exterior surface 24 of the motor 12 when the collar 10 is secured around the motor 12 so that the arcuate internal surfaces 22A and 22B of the base portions 20A and 20B receive heat directly from the motor 12.

Each half 14A and 14B is provided with an outwarding extending J-shaped arm 16J and 18J, respectively, as one end of the half 14A and 14B and with a second outwardly extending straight arm 16S and 18S, respectively, as the opposite end of the half 14A and 14B so that the straight arms 16S and 18S of each of the halves 14A and 14B are removably received in the J-shaped arms 18J and 16J, respectively of the other half 14B and 14A in order to secure the halves 14A and 14B together to form the collar 10 for the motor 12. In order for the two halves 14A and 14B to be thus joined together, one of the halves, 14A or 14B, must be moved longitudinally relative to the motor 12 and the other half 14B or 14A so that the set of end 16J and 18S are secured together and the set of ends 16S and 18J are secured together in a locked position, as best illustrated in FIGS. 1 and 2.

Clamps 26 can be employed to hold together the two sets of ends so that the set of end 16J and 18S are clamped securely together and the set of ends 16S and 18J are also clamped securely together. Each of the straight arms 16S and 18S is provided with a pair of raised lips 28A and 28B to accommodate a clamp 26 for the purpose of securing the straight arms 16S and 18S to their associated J-shaped arm 18J and 16J, respectively. Various types of clamps 26 are useful for this purpose, including, but not limited to c-clamps, cable clamps, etc.

In order to remove the collar 10 from the motor 12, the clamps 26 are first removed and then one of the halves, either 14A or 14B is moved longitudinally relative to the motor 12 so that both sets of ends, i.e. the set of ends 16J and 18S and the set of ends 16S and 18J, disengage each other. The halves 14A and 14B are then unlocked from each other. Once the halves 14A and 14B are unlocked, they are free to be removed from the motor 12.

Each of the halves 14A and 14B is provided with a plurality of individual, spaced apart fins 30 secured to and radiating outwardly from the base portion of the half 14A and 14B so that heat received by the base portions 20A and 20B from the motor 12 is transferred from the base portions 20A and 20B via the fins 30 to the surrounding air. Each fin 30 is secured to the base portion 20A or 20B of its respective half 14A and 14B and extends outward from the base portion 20A and 20B. Each fin 30 is aligned parallel to the longitudinal axis 32 of the collar 10 so that air flowing longitudinally along the motor 12 flows between the adjacent fins 30 since the longitudinal axis 32 for the collar 10 coincides with the motor's longitudinal axis 32 when the collar 10 is attached to the motor 12.

Also, each of the fins 30 is tapered along its radial length 34, as illustrated in FIG. 2, so that each fin 30 has a width 36 at a proximal end 38 of the fin 30, i.e. the proximal end 38 is the portion of the fin 30 that attaches to the base portion 20A or 20B, than its greater than a width 40 at its distal end 42, i.e. the distal end 42 is the tip end of the fin 30 that is located furthest from the base portion 20A or 20B. Thus when viewed from the front of the collar 10, as illustrated in FIG. 2, the fins 30 are tapered in configuration. This tapered configuration allows for better heat transfer between the proximal end 38 and distal end 42 of each fin 30 and allows for better heat dissipation from the motor 12 to the surrounding air. In addition, the fins 30 increase the surface area of the collar 10, thus increasing the heat transfer that occurs between the motor 12 and the surrounding air via the collar 10. The length 34 of the fins 30 is sufficient to provide the necessary surface area for efficient heat transfer from the motor 12 to the surrounding air, but is not so large as to present a problem of attaching the collar 10 to the motor 12 even when the motor 12 is located in a confined area, such as for example when the motor 12 is located within a heating and air conditioning unit.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A heat dissipating collar for a motor comprising:

two identical halves interlocking together on their ends to form a collar that removably secures around a motor, a base portion provided on each half, each base portion provided with an arcuate internal surface for engagement with a motor, and a plurality of fins attached to each base portion and extending outward radially from the base portion.

2. A heat dissipating collar according to claim 1 wherein each of the fins is aligned along a longitudinal axis of the collar.

3. A heat dissipating collar for a motor comprising:

two identical halves capable of being secured together on their ends to form a collar that removably secures around a motor, a base portion provided on each half, each base portion provided with an arcuate internal surface for engagement with a motor.

4. A heat dissipating collar according to claim 3 further comprising:

a clamp securing to each J-shaped arm and its associated straight arm to secure the arms together.

5. A heat dissipating collar according to claim 4 further comprising:

a pair of raised lips provided on each straight arm as a means of retaining the clamp that secures each J-shaped arm to its associated straight arm.

6. A heat dissipating collar according to claim 1 wherein the halves are constructed of heat conductive material.

7. A heat dissipating collar according to claim 1 wherein each fin is tapered so that the fin is thicker in width at its proximal end than at its distal end.

8. A heat dissipating collar for a motor comprising:

two halves interlocking together on their ends to form a collar that removably secures around a motor, a base portion provided on each half, each base portion provided with an arcuate internal surface for engagement with a motor, and a plurality of fins attached to each base portion and extending outward radially from the base portion.

9. A heat dissipating collar according to claim 8 wherein the halves are constructed of heat conductive material.

10. A heat dissipating collar according to claim 9 wherein each of the fins is aligned along a longitudinal axis of the collar.

11. A heat dissipating collar according to claim 10 wherein each fin is tapered so that the fin is thicker in width at its proximal end than at its distal end.

12. A heat dissipating collar for a motor comprising:

two halves capable of being secured together on their ends to form a collar that removably secures around a motor, a base portion provided on each half, each base portion provided with an arcuate internal surface for engagement with a motor, a plurality of fins attached to each base portion and extending outward radially from the base portion, the halves are constructed of heat conductive material, and one of the ends of each of the identical halves provided with a J-shaped arm and the other end of each of the halves proved with a straight arm so that the J-shaped arms of each half engage the straight arms of the other half to removably secure the collar around a motor.

13. A heat dissipating collar according to claim 12 further comprising:

a clamp securing to each J-shaped arm and its associated straight arm to secure the arms together.

14. A heat dissipating collar according to claim 13 further comprising:

a pair of raised lips provided on each straight arm as a means of retaining the clamp that secures each J-shaped arm to its associated straight arm.

* * * * *